United States Patent
Anderberg

[19]

[11] Patent Number: 6,119,058
[45] Date of Patent: Sep. 12, 2000

[54] METHOD AND SYSTEMS FOR CONTROLLING THE SERVICE FOR AN AIRCRAFT

[75] Inventor: Nils-Eric Anderberg, Trelleborg, Sweden

[73] Assignee: FMT International Trade AB, Trelleborg, Sweden

[21] Appl. No.: 08/836,171

[22] PCT Filed: Sep. 26, 1995

[86] PCT No.: PCT/SE95/01098

§ 371 Date: Jun. 23, 1997

§ 102(e) Date: Jun. 23, 1997

[87] PCT Pub. No.: WO96/12643

PCT Pub. Date: May 2, 1996

[30] Foreign Application Priority Data

Oct. 20, 1994 [SE] Sweden ................................ 9403605

[51] Int. Cl.[7] .................................................. B64F 1/36
[52] U.S. Cl. .................................................. 701/29; 701/3
[58] Field of Search .................. 701/29, 33, 35, 701/3; 705/413

[56] References Cited

U.S. PATENT DOCUMENTS

| | | | |
|---|---|---|---|
| 4,809,174 | 2/1989 | Momenthy | 364/424.012 |
| 5,204,819 | 4/1993 | Ryan | 364/464.23 |
| 5,297,423 | 3/1994 | Keating et al. | 73/49.2 |
| 5,596,501 | 1/1997 | Comer et al. | 705/413 |

Primary Examiner—Michael J. Zanelli
Attorney, Agent, or Firm—Dvorak & Orum

[57] ABSTRACT

In a method and a device for controlling the servicing of an aircraft parked at a stand, the servicing is carried out from a plurality of servicing units which are stationarily arranged adjacent to the stand and which each are adapted to supply fuel, water, compressed air, preconditioned air or electric power to the aircraft or to service the toilets of the aircraft. A plurality of local computer units are each disposed in a a servicing unit and have an associated display as well as an associated inputting device. A central computer unit is connected to each of the local computer units and to an information receiver in or in the vicinity of the aircraft. The central computer unit transmits information to the local computer units of the servicing units on the servicing to be carried out. Each of the local computer units records information on the servicing carried out and transmits this information to the central computer unit, which in turn transmits the information to the information receiver.

20 Claims, 2 Drawing Sheets

METHOD AND SYSTEMS FOR CONTROLLING THE SERVICE FOR AN AIRCRAFT

BACKGROUND OF THE INVENTION

1. Field of the Invention

The present invention relates to a method and a system for controlling the servicing of an aircraft which is parked at a stand at an airport, said servicing being carried out from a plurality of servicing units which are stationarily arranged adjacent to the stand. The invention further concerns a system for refuelling an aircraft.

2. Discussion of the Prior Art

As a rule, today's aircraft only stop briefly at the airport in order to set down and pick up passengers and/or to unload and load freight. During these brief stops, the aircraft has to be serviced in a number of ways. For instance, the aircraft has to be refuelled, the toilets have to be emptied and replenished with disinfectant, the batteries have to be charged, and preconditioned air and compressed air have to be supplied. Normally, the servicing of the aircraft is carried out with the aid of vehicles.

Here follows, for exemplifying purposes, a description of how the aircraft is refuelled. When the aircraft to be serviced is approaching the airport and it has been decided at which gate it is to come to a halt, i.e. at which stand the aircraft is to park, a refuelling vehicle (a so-called dispenser) is informed via the radio or a TV monitor that it is to drive out to the stand. When the aircraft has parked at the gate, the serviceman connects a hose from the vehicle to a fuel line in the ground, this fuel line being in turn connected to a fuel store. Then, he unwinds from a hose reel on the vehicle another hose which is in communication with the first hose and connects it to a refuelling point on the aircraft. At the same time, he adjusts a control valve at the refuelling point, so as to set the amount of fuel that is to be supplied to the aircraft. Information on the amount of fuel to be supplied is found on a fuel list printed out by the airline and given to the serviceman. Subsequently, the actual refuelling of the aircraft is carried out. During this operation, the serviceman is watching a mechanical counter provided in the refuelling vehicle, and he interrupts the refuelling of the aircraft when the amount of fuel indicated on the list has been supplied. If the amount of fuel set with the aid of the control valve is supplied without the serviceman interrupting the refuelling operation, the control valve will automatically turn off the fuel supply.

When the refuelling has been completed, the serviceman looks at the counter and writes down the amount of fuel supplied on the fuel list. One copy of this list is given to the captain of the aircraft so that he may sign it, and another copy is sent to the oil company, who makes use of it when invoicing the airline.

The remaining service for the aircraft is carried out in similar fashion from vehicles that are driven up to the stand. Service personnel service the aircraft according to written instructions obtained from the airline, and indicate on various forms which service has been performed and in which quantities. These forms are then given to a foreman belonging to the ground crew, who uses the information contained therein to compile a freight list which, like the fuel list, is given to the captain so that he may sign it and which also is used for invoicing purposes.

It goes without saying that it is of extreme importance that the servicing of the aircraft is correctly performed and involves the right quantities. To ensure that this is so, various control systems have been provided. For instance, the refuelling of the aircraft should, as mentioned in the foregoing, be sanctioned by the captain. There are further provided fuel meters in the aircraft, enabling a verification of the amount of fuel supplied.

Despite the provision of these control systems, errors may, however, occur. The service personnel may, for instance, mistake the amount of fuel that is to be supplied or has been supplied or write down an incorrect number on the fuel list given to the captain. An extra security risk resides in the supplementary refuelling sometimes carried out after the ordinary refuelling, for instance because the weather conditions at the emergency landing ground have worsened and one therefore has to take into account a possible landing at another emergency landing ground farther away. The information on the supplementary refuelling is often transmitted by radio or phone to the service personnel, which of course increases the risk of misunderstandings and errors.

Should a mistake, or at worst a wilful deception, occur, it is furthermore difficult to afterwards sort out what really happened, since all entries regarding the servicing carried out are based on handwritten information, which may be more or less correct. It is true that the refuelling vehicles are equipped with flow meters, but these do not indicate afterwards to which aircraft or when the recorded amount of fuel has been supplied.

It is furthermore known to carry out the servicing described above from units that are permanently arranged on the ramp. For instance, the present applicant has developed servicing units which are lowered into the ramp when not in use, but can be raised above ground with the aid of an elevator device when to be used. However, the security problems described above remain the same.

SUMMARY OF THE INVENTION

The object of this invention is, therefore, to provide a safer and more reliable system as well as a safer and more reliable method for servicing, especially refuelling, aircraft.

According to the invention, this object is achieved by a system and a method having the distinctive features recited in the appended claims.

To be more specific, the invention provides an unbroken electronic chain of information, involving no human interference with ensuing risks of mistakes, from the moment the servicing to be performed has been decided and inputted to a computer until the moment the servicing at issue has been carried out and reported to the aircraft and back to the computer which ordered it.

DETAILED DESCRIPTION OF THE DRAWINGS

Figure 1:
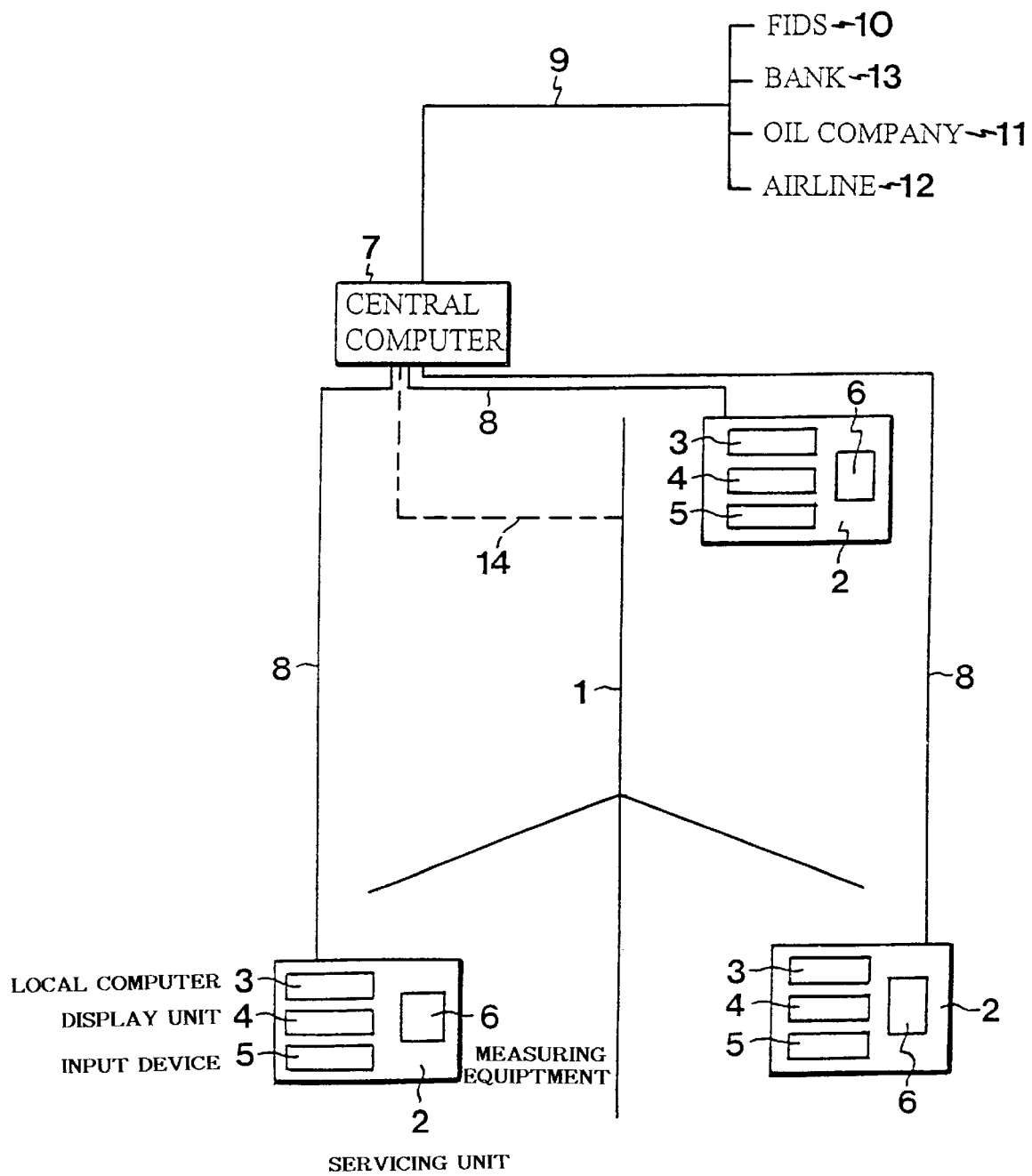
Figure 2:
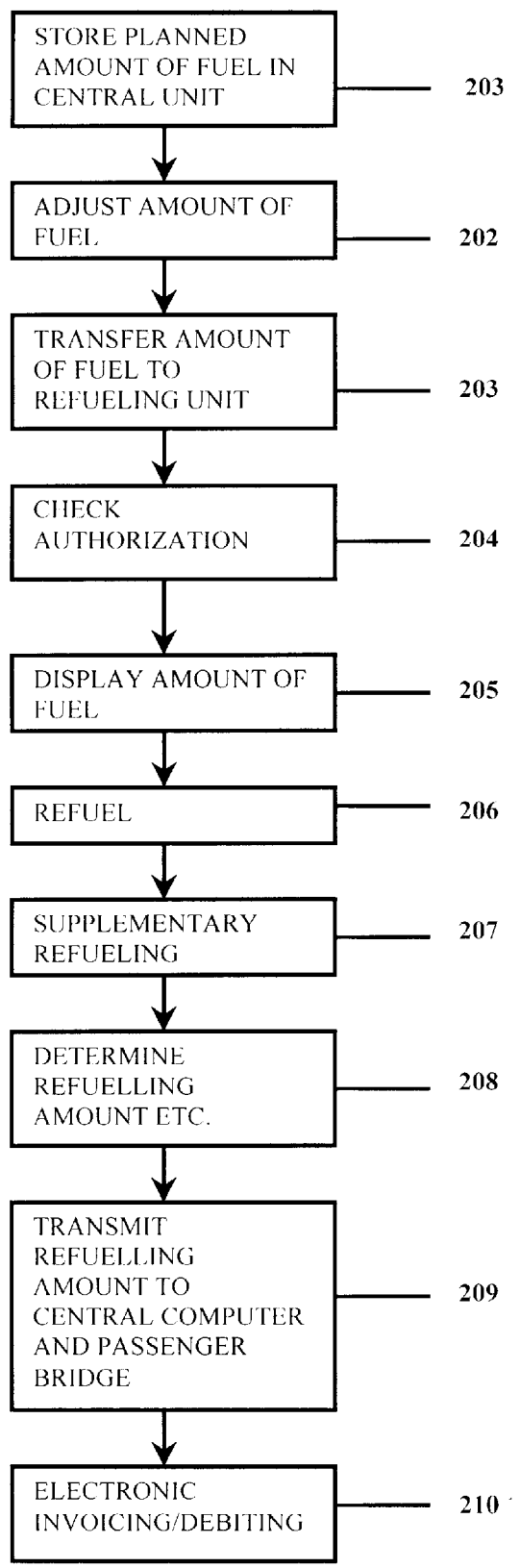

An embodiment of the invention will now be described in more detail with reference to the accompanying drawings, in which FIG. 1 is schematic view of a system according to the invention; and FIG. 2 is a flow chart illustrating a mode of implementation of the method according to the invention.

DETAILED DESCRIPTION OF THE PREFERRED EMBODIMENT

FIG. 1 schematically indicates an aircraft 1 which is parked at a stand at an airport. At the stand, there are three stationary servicing units 2, each performing one or more servicing operations. The servicing units may be of the type having one position of rest, in which they are lowered into the ramp, and one position of operation, in which they are located above the ramp and to which they are elevated with the aid of an elevator device.

A local computer unit 3 is provided in each of the servicing units 2. The computer unit 3 may be a PLC or some other suitable computer unit able to carry out the functions described in the following.

A display 4 is connected to each computer unit 3 and is preferably mounted in the servicing unit 2 itself, so as to be visible in the position of operation. Alternatively, the display 4 may be mounted on a wall, a post or the like in the vicinity of the servicing unit, so as to be visible at all times.

Furthermore, an inputting device 5, which is so disposed as to be accessible in the position of operation of the servicing unit, is connected to each computer unit 3. The inputting device may consist of a keypad or a card reader, by means of which a member of the service personnel may input information, for instance an authorization code.

In at least the majority of the servicing units, there is further provided electronic measuring equipment 6 for monitoring and recording the servicing carried out. In a refuelling unit, there may, for example, be provided an electronic flow meter for recording the amount of fuel supplied. The electronic measuring equipment is connected to the local computer unit.

In each of the local computer units 3, there is further stored a unique identity serving to identify the unit when it is in communication with other units in the system.

Each of the local computer units 3 is connected to at least one central computer 7, for instance a PC, which is disposed at a distance from the servicing units, preferably in the terminal building. The central computer and the local computers are preferably interconnected by means of stationary lines 8 for transmitting electric or optical signals, but also wireless communication is conceivable. At any rate, the connection should enable two-way communication between the central computer 7 and the local units 3.

The central computer unit 7 is preferably connected to a network 9 via which it is able to contact the administrative database of the airport, i.e. the so-called FIDS or FIS system 10, the different oil companies 11 operating at the airport, and/or various airlines 12 and banks 13.

As indicated by the dashed line 14, the central computer unit 7 is also connected to the aircraft parked at the stand, either directly to the computer of the aircraft or to a printer that is located in the vicinity of the aircraft, for instance in a passenger bridge at the gate.

In the following, the function of the inventive system will be illustrated with the aid of a description of the refuelling of an aircraft, reference being made to the flow chart of FIG. 2.

Thus, the airlines plan their flights well in advance. When a flight has been planned, it is possible to plan also the amount of fuel that is to be supplied to the aircraft doing the flight. The amount of fuel planned is stored in the central computer unit 7 (box 201) along with other relevant information, such as the airline, the flight number, the destination of the flight, the gate at which the aircraft is to park before departure, the fuel supplier, the fuel price, and the identity of the servicing unit from which the refuelling is to be carried out, as well as other information, such as the quality of the fuel and the status of the servicing unit. The amount of fuel planned is optionally (box 202) adjusted before the refuelling.

When the aircraft is located at a certain predetermined distance from the airport and it has been decided at which gate the aircraft is to park, the central computer unit 7 presets the refuelling unit 2 at this gate by transmitting information on the relevant amount of fuel to the local computer unit 3 (box 203) of the refuelling unit. Thus, the amount of fuel may be either the long-planned standard amount of fuel for the particular destination of the aircraft or an adjusted amount of fuel that has been altered, e.g. owing to the current weather conditions.

When the aircraft has parked at the gate, the central computer is informed of this by the FIDS system. The central computer unit 7 then transmits a release signal to the computer unit 3 in the refuelling unit, such that the latter is automatically elevated to the position of operation or it becomes possible for a serviceman on the ramp to cause it to be thus elevated.

When the refuelling unit has come to occupy its position of operation, the serviceman that is to carry out the refuelling operation inputs an authorization code via the inputting device. The computer unit stores this authorization code, such that it will afterwards be possible to know who performed the refuelling. The computer unit also compares the authorisation code with codes stored in advance, thereby to verify that the serviceman really is authorized to carry out the refuelling (box 204).

Thereafter, the computer unit 3 indicates on the display 4 the amount of fuel to be supplied (box 205) and preferably also indicates other information on the refuelling, such as the type of aircraft and the destination, thus enabling the serviceman to verify that the information transmitted from the central computer is correct. According to the invention, it is thus the servicing unit that informs the serviceman of the type of servicing to be performed and the quantity involved, and not the other way around as was previously the case.

The serviceman then connects the hose from the refuelling unit to the refuelling point of the aircraft, whereupon the refuelling begins (box 206). The remaining amount of fuel to be supplied is counted down on the display. When the amount of fuel indicated by the central computer has been supplied, the local computer unit automatically interrupts the refuelling by controlling an on-off valve. Optionally, supplementary refuelling (box 207) is also carried out, if the amount of fuel to be supplied is adjusted at a late stage. Information on the supplementary refuelling, if any, is transmitted from the central computer unit.

The local computer unit 3 retrieves information during the refuelling operation. Inter alia, this unit records the starting time and the stopping time of the refuelling, any supplementary refuelling performed after the refuelling proper, the net volume of fuel supplied (box 208), the accumulated volume of fuel supplied through the refuelling unit at issue, as well as the temperature of the fuel, which is determined with the aid of an electronic temperature gauge provided in the refuelling unit and connected to the local computer unit.

After the refuelling has been completed, the local computer unit transmits the retrieved information to the central computer unit for processing (box 209). Some information, for instance on the accumulated volume of fuel, may also be stored in the memory of the local computer unit. Finally, the refuelling unit is lowered into the ground and is blocked, so that it cannot be elevated. A signal indicating this is transmitted to the central computer unit.

The remaining servicing of the aircraft from the stationary servicing units is carried out in a fashion similar to that described above, involving the presetting of the servicing to be performed, the retrieval of information, and the report of the servicing carried out to the central computer unit which, having received the reports from the servicing units involved, checks the servicing carried out against the servicing planned and compiles a freight list with an associated fuel list which is electronically transmitted to a printer in the passenger bridge at the gate at issue, so as to be printed out and forwarded to the captain of the aircraft, who as before has to sign these documents. Alternatively or additionally, the information on the freight and the fuel list can be shown on a display in front of the aircraft or be supplied in wireless fashion directly to the computer of the aircraft from a transmitter in the central computer, The essential thing is that the information reaching the captain is not based on manual reading and recording of information with the ensuing risks of mistakes being made. It is not until the captain has signed the list or otherwise sanctioned the relevant information and a signal indicating that the servicing units have been lowered into the ramp has been obtained that the aircraft may be allowed to depart, In the central computer unit, the density of the supplied fuel is further calculated on the basis of the measured temperature. Then, the volume of fuel supplied is converted to a mass of fuel supplied, on the basis of which the total price for the customer is determined. Finally, an invoice can be drawn up and sent electronically via the network 9 or in the form of a paper to the airline that has bought the fuel, a copy being forwarded to the oil company that has delivered the fuel. Alternatively, the buyer's bank account can be debited directly via the network (box 210).

The rapid transfer of information on the supplied amount of fuel to the central computer unit and further on to the oil company that has delivered the fuel has the advantage of enabling the detection of leaks, if any, in the fuel system of the airport. If the total amount of fuel supplied to aircraft via different refuelling units at the airport is compared with the total amount of fuel supplied from the fuel store to which the refuelling units are connected via different fuel lines, any differences between the amount supplied from the fuel store and the total amount refuelled can be detected, and one thus obtains an early indication that there is a leakage.

Preferably, the refuelling unit may be of a type comprising a hose assembly with at least one hose which is in communication with a fuel line, as well as an elevator device on which the hose assembly is mounted and which is adapted to displace the hose assembly between a position below ground and a position above ground. The refuelling unit may further have a fuel-filter unit for filtering the fuel from the fuel line, a recovery tank and at least one control valve for turning the fuel from the fuel line on and off. At least the majority of the fuel-filter unit, the flow meter, the control valve and the recovery tank are suitably arranged separately from the elevator device and upstream therefrom in the direction of the fuel supply, and are further, along with the elevator device, arranged in a container, which has a first opening for the displacement of the hose assembly between the position below ground and the position above ground and a second opening permitting access to the interior of the container, as well as a lead-in forming an inlet from the fuel line. This refuelling unit has the advantage of enabling the service personnel to get down into the container through the second opening, and thus easily get access to all the component parts when maintenance or repair is called for. In addition, the maintenance work may then be carried out in a protected environment.

Even though the refuelling unit described above is preferred, it goes without saying that the method and the general system for controlling the servicing of aircraft can be applied to refuelling units of some other construction, as well as to servicing units that cannot be lowered into the ground.

Finally, it should be emphasized that the method and the systems according to the invention may be used for controlling the servicing at many stands at an airport, in which case a common central computer unit can be used for all these stands.

I claim:

1. A system for controlling the servicing of an aircraft which is parked at a stand at an airport, said servicing being carried out from a plurality of servicing units which are stationarily arranged adjacent to the stand and each of which are adapted to supply the aircraft with at least one of a fuel, water, compressed air, preconditioned air, electric power and emptying of the toilets of the aircraft, comprising:

a plurality of local computer units each disposed in a servicing unit and each having an associated display and a unique identity;

a central computer unit disposed at a distance from the servicing units and connected to each of the local computer units; and an information receiver located at one of near the parked aircraft and within the parked aircraft, said information receiver connected to said central computer unit, wherein prior to servicing an aircraft, said central computer unit transmits information on the servicing to be performed to the local computer units of the servicing units, wherein each of the local computer units is adapted to control the servicing and to record information on the provided servicing, and to transmit the recorded servicing information to the central computer unit, which said central computer unit is adapted to transmit to the information receiver at least some of the received information on the provided servicing.

2. The system as claimed in claim 1, wherein the central computer unit is connected to an administrative database of the airport.

3. A system as claimed in claim 2, wherein the information receiver comprises a computer onboard an aircraft parked at the stand, and wherein the central computer unit includes a transmitter for wireless transmission of information to the information receiver.

4. The system as claimed in claim 2, wherein at least one servicing unit supplies a fluid to the aircraft and has a flow meter for determining the volume of fluid supplied, as well as means for turning the fluid supply on and off, and wherein the local computer unit in said at least one servicing unit is connected to the flow meter and to the means for turning the fluid supply on and off and is adapted to turn the fluid supply off when a predetermined volume of fluid has been supplied.

5. The system as claimed in claim 2, wherein the central computer unit is connected to a computer system of at least one airline or oil company in order to achieve an automatic invoicing for the provided servicing.

6. The system as claimed in claim 1, wherein the information receiver comprises a computer onboard the aircraft parked at the stand, and wherein the central computer unit includes a transmitter for wireless transmission of information to the information receiver.

7. The system as claimed in claim 6, wherein at least one servicing unit supplies a fluid to the aircraft and has a flow meter for determining the volume of fluid supplied, as well as means for turning the fluid supply on and off, and wherein the local computer unit in said at least one servicing unit is connected to the flow meter and to the means for turning the fluid supply on and off and is adapted to turn the fluid supply off when a predetermined volume of fluid has been supplied.

8. The system as claimed in claim 6, wherein the central computer unit is connected to a computer system of at least one airline or oil company in order to achieve an automatic invoicing for the provided servicing.

9. The system as claimed in claim 1, wherein at least one servicing unit supplies a fluid to the aircraft and has a flow meter for determining the volume of fluid supplied, as well as means for turning the fluid supply on and off, and wherein the local computer unit in said at least one servicing unit is connected to the flow meter and to the means for turning the fluid supply on and off and is adapted to turn the fluid supply off when a predetermined volume of fluid has been supplied.

10. The system as claimed in claim 9, wherein the central computer unit is connected to a computer system of at least one airline or oil company in order to achieve an automatic invoicing for the provided servicing.

11. The system as claimed in claim 1, wherein the central computer unit is connected to a computer system of at least one airline or oil company in order to achieve an automatic invoicing for the provided servicing.

12. The system as claimed in claim 1, wherein each local computer unit has an inputting device for entry of an authorization code.

13. A system for controlling a refueling unit that refuels an aircraft which is parked at a stand at an airport, said
refueling unit stationarily arranged adjacent to the stand and adapted to supply fuel from a fuel line below ground to the aircraft, said refueling unit including a flow meter to measure an amount of fuel supplied during refueling, said system comprising:
a local computer unit with an associated display, said local computer unit being arranged in the refueling unit and having a unique identity;
a central computer unit disposed at a distance from the refueling unit; and
an information receiver located at one of near the vicinity of the aircraft and within the aircraft, and information receiver connected to said central computer unit, said local computer unit being adapted to control the fuel supply and then transmit information on the amount of fuel metered by the flow meter to the central computer unit, which in turn is adapted to transmit the same information on the metered amount of fuel to the information receiver.

14. The system as claimed in claim 13, wherein the refueling unit comprises a hose assembly having at least one hose in communication with a fuel line, and an elevator device for mounting thereon the hose assembly, said elevator device adapted to displace the hose assembly between a position below ground and a position above ground.

15. The system as claimed in claim 14, further including a fuel-filter unit for filtering the fuel from the fuel line, a recovery tank, and at least one control valve for turning the fuel from the fuel line on and off, the elevator device, fuel-filter unit, the flow meter, the control valve and the recovery tank being disposed within an underground container, said fuel filter unit, said flow meter, said control valve and said recovery tank arranged separately from the elevator device and upstream therefrom in a direction of the fuel supply, said container having a first opening for the displacement of the hose assembly between the position below ground and the position above ground and a second opening for accessing an interior of the container, as well as a lead-in forming an inlet from the fuel line.

16. The system as claimed in claim 13, wherein the central computer unit is connected to an administrative database of the airport, and is adapted to transmit information to the local computer unit concerning an amount of fuel to be supplied to the aircraft when the central computer unit receives information from the administrative database indicating that an aircraft which is to park at the stand is approaching the airport.

17. A method for controlling the servicing of an aircraft which is parked at a stand at an airport, said servicing being carried out from a plurality of servicing units which are stationarily arranged adjacent to the stand, each of said servicing units having a local computer unit therein, each of said local computer units including a display, said servicing providing at least one of a supply of fuel, water, compressed air, preconditioned air, electric power and emptying of the toilets of the aircraft, comprising the steps of:
planning the servicing of the aircraft and storing information thereon in a central computer unit;
presetting the servicing units by transmitting servicing information from the central computer unit to said local computer units;
displaying information on the servicing to be performed by each of the respective servicing units on each respective local computer unit display;
performing the servicing indicated on the display under the control of the local computer unit in the respective servicing unit and storing the information in the local computer unit of the respective servicing unit;
retrieving the stored information concerning the performed servicing carried out by the associated servicing unit and transmitting the retrieved information to the central computer unit; and
directing the central computer unit to compile the servicing information obtained from each of the local computer units and then transmitting this compiled information to an information receiver located at one of near and within the aircraft.

18. The method as claimed in claim 17, wherein the step of transmitting information to the local computer units is performed when the central computer unit has received information from an administrative database of the airport indicating that an aircraft which is to park at the stand is approaching the airport.

19. The method as claimed in claim 17, wherein the central computer unit totals the fuel supplied to aircraft from a plurality of servicing units connected to a fuel store, and compares the total with a total amount of fuel supplied from the fuel store, wherein a difference represents a leak in the fuel lines of the airport.

20. The method as claimed in claim 17, wherein prior to performing the servicing indicated on the local computer unit display, an operator inputted authorization code is compared with a stored authorization code to verify that the operator is authorized to service the aircraft.

* * * * *